Oct. 31, 1939.                P. F. HATCH                2,178,101
                        WHEEL BALANCING APPARATUS
                           Filed May 13, 1937
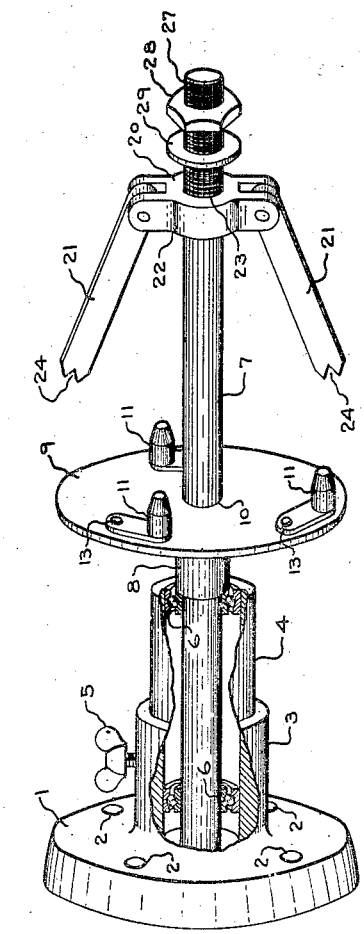
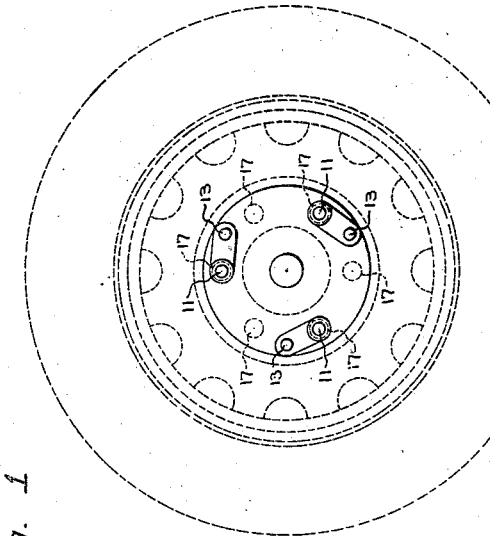
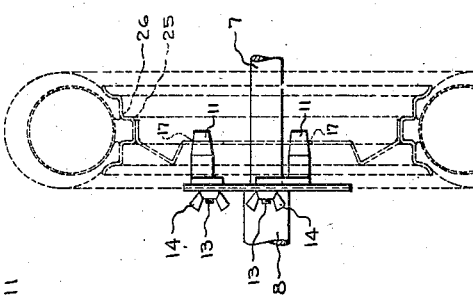
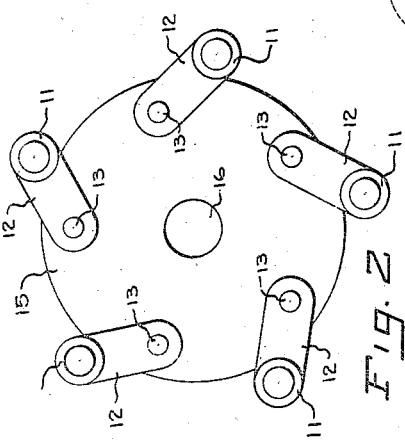
Inventor
PAUL F. HATCH
By Beaman & Langford
Attorneys Patented Oct. 31, 1939

2,178,101

UNITED STATES PATENT OFFICE 2,178,101

WHEEL BALANCING APPARATUS

Paul F. Hatch, Ypsilanti, Mich., assignor to Harley C. Loney Company, Detroit, Mich., a corporation of Michigan Application May 13, 1937, Serial No. 142,331

4 Claims. (Cl. 144—288)

This invention relates to wheel balancing apparatus and more particularly to a device for supporting the wheel for free rotation about its axis.

In supporting modern automotive vehicle wheels for free rotation so that the heavy point may be determined and balancing weights applied in any of the usual ways it is necessary that some support be provided to hold and center the wheel with respect to the center of rotation. It is desirable that a wheel supporting and centering device be rugged in order to withstand the hard usage of the shop and yet be adjustable to provide for its adaptation to wheels of different sizes. The present invention provides such a device for engagement with the stud receiving holes in the hub plate.

An object of the invention is to provide a wheel support which may be readily secured to the hub portion of the wheel.

Another object of the invention is to provide a wheel support having a plurality of pins for engaging with the hub portion of a vehicle wheel.

Still another object of the invention is to provide a plurality of pins for centering a wheel about an axis of rotation and means for clamping a wheel against the pins.

These and other objects will become apparent when taken with the accompanying drawing in which Fig. 1 is a perspective view of the balancing apparatus, Fig. 2 is an elevation of a second form of a portion of the balancing apparatus, Fig. 3 is an end view of a wheel supported on the centering device of the balancing apparatus, and Fig. 4 is a front view of a wheel supported on the centering device of the balancing apparatus.

Referring particularly to the drawing the reference character 1 indicates a base in which the balancing device is supported. The base 1 is provided with bores 2 through which bolts or screws may be passed for securing it to a wall or side of a bench. The base 1 which preferably is a casting has an integral laterally projecting socket 3 in which is received a cylindrical sleeve 4. A thumb screw 5 secures the sleeve 4 in the socket 3. Internally of the sleeve 4 are disposed bearings 6 in which is rotatably supported a spindle 7.

Mounted on the spindle 7 abutting the outer bearing 6 is a collar 8 which is freely rotatable with the spindle 7 and which may be integral therewith or separate. Also mounted on the spindle 7 is the wheel centering device which comprises a disc 9 having a central opening 10 through which the spindle 7 passes, and a plurality of wheel engaging pins 11. The pins 11 are each mounted adjacent the end of arms 12 which are in turn pivoted by pins 13 to the disc 9 on an imaginary circle having its center at the center of the disc 9. Each pin 13 is rigidly secured to its respective arm 12, is threaded and has disposed on the threaded portion, projecting from the opposite side of the disc 9 from the arms 12, a wing nut 14 for the purpose of clamping the respective arms 12 in adjusted positions. The pins 13 are equally spaced about the imaginary circle on which they are disposed.

It will be obvious from the description thus far that the wheel engaging pins 11 may be pivoted about the pins 13 and that by so moving them they may be placed on imaginary concentric circles of a great many different diameters varying from the smallest when the arms 12 are directed radially inwardly from the pins 13 to the largest when the arms 12 are directed radially outwardly from the pins 13 and that for each circular position of the pins 11 they will be equally spaced about the imaginary circles. Also the imaginary circles will have as their center the center of the disc 9.

The outer ends of the wheel engaging pins 11 are tapered for engagement with the usual holes with which wheel hubs are provided for receiving mounting studs. As shown in Fig. 1 three pins are provided making this particular centering device applicable for use on wheels having three mounting stud receiving holes or any multiple of three. However, as shown in Fig. 2 any number of wheel engaging pins 11 may be provided, the form shown in Fig. 2 having five pins 11 mounted on arms 12 which are pivoted on a disc 15 provided with a spindle receiving opening 16.

In using the present invention for balancing a wheel the wheel is placed one side down on the floor or a bench, the disc 9 together with the arms 12 and pins 11 is placed over the hub thereof and the pins 11 are disposed in the openings 17 provided for receiving mounting studs. When the pins 11 have been thus located the wing nuts 14 are tightened clamping the arms 12 carrying the pins 11 in adjusted position. The disc 9 is then removed from its position on the hub and slipped over the end of the spindle 7, the spindle 7 passing through the opening 10 in the center of the disc 9 and the back side of the disc 9 on which the wing nuts 14 are disposed abutting against the collar 8. The wheel is then positioned adjacent the disc 9 concentrically about the spindle 7 and the pins 11 are inserted in the openings 17 in the wheel hub. As shown particularly in Fig. 4 there are six openings 17, the pins 11 being disposed in every other one. The wheel is now centered about the axis of the spindle 7.

In order to hold the wheel on the pins 11 an adjustable clamping member 20 is provided. The member 20 is provided with arms 21 which are pivoted at one end to a body portion 22 having a central opening 23 for slidably receiving a spindle 7. The free end of each arm 21 is tapered and provided with a central notch 24. In use the arms 21 are angularly adjusted with respect to the spindle 7 until the notches 24 or tapered ends engage with some part of the wheel or rim. Thus referring to Fig. 3 the notches 24 might engage with the outside corner 25 of the felly or the tapered ends might engage with the inside corner 26 of the rim. The outer end of the spindle 7 has a threaded portion 27 on which is threaded a nut 28 for urging the clamping member 20 against the wheel mounted on the pins 11. The thrust from the nut 28 is directed through the wheel to the pins 11, and through the pins 11 and the disc 9 to the collar 8 whereby the wheel is rigidly disposed with respect to the spindle 7. As the spindle 7 is mounted in the bearings 6 for free rotation the entire wheel may rotate freely resulting in the heavy side moving to the bottom thereby providing an indication of the correct position for the balancing weight or weights.

The arms 21 are diametrically opposite each other with respect to the spindle 7 in order that only two arms will be needed for clamping the wheel in centered position and that the centering and balancing apparatus may be inherently balanced. Of course, more than two equally spaced arms could be used. A washer 29 is provided for disposition between the clamping member 20 and the nut 28.

As is shown in Fig. 3 the tapered ends of the pins 11 seat within the openings 17 thereby providing a firm support so that the clamping member 20 when urged against the wheel by the nut 28 may hold the wheel rigidly with respect to and perpendicularly to the spindle 7.

Having thus described my invention what I desire to secure by Letters Patent and claim is:

1. A device of the character described for supporting a vehicle wheel having a hub portion and a plurality of holes therein for rotation about its axis, comprising supporting means, a plurality of arms pivoted to said supporting means, a tapered pin secured to each of said arms and projecting laterally in the same direction for engagement with said holes, said arms being pivotable in a plane normal to the rotative axis of the wheel, said supporting means and pins being for the centering of the wheel about its axis, and a freely rotatable spindle upon which said supporting means is carried.

2. A device of the character described for supporting a vehicle wheel having a hub portion and a plurality of holes therein for rotation about its axis, comprising a freely rotatable spindle, supporting means mounted on said spindle, a plurality of arms pivoted to said spindle, a tapered pin mounted on each arm and projecting laterally in one direction for engagement with the holes in said wheel and for centering said wheel with respect to the axis of rotation of said spindle, said arms being pivotable in a plane normal to the rotative axis of the wheel, and means for clamping the wheel on said pins whereby the wheel is rigidly supported with respect to said spindle for free rotation therewith.

3. As an article of manufacture, an adapter for wheel balancing fixtures, comprising a supporting plate having a central aperture to receive a spindle, a plurality of supporting and centering pins having tapered seat portions adapted to partially project through the bolt holes of a wheel hub so as to collectively provide a central and supporting abutment for the wheel, swinging link members of equal length upon which said pins are mounted, and pivotal connections between said members and said plate, said pivotal connections being spaced about a common circle.

4. A wheel balancing fixture for mounting vehicle wheels through the bolt holes in the hubs, comprising a freely rotatable spindle, mounting pins disposed in a circle having tapered seat portions of a size adapted to extend only part way through the bolt holes in the hub so as to provide a centering and supporting abutment in both radial and axial directions, supporting structure for said pins carried upon said spindle and disposing said seat portions in a plane normal to the axis of rotation of said spindle, and a clamp upon said spindle and positionable upon the opposite side of the wheel from said supporting structure for clamping the wheel upon said seat portions.

PAUL F. HATCH.